(12) United States Patent
Tracht et al.

(10) Patent No.: US 7,621,557 B2
(45) Date of Patent: Nov. 24, 2009

(54) VEHICLE SEAT AIR BAG GUIDE HAVING FLEXIBLE PANEL WITH INNER EXTREMITY GROMMET SECUREMENT

(75) Inventors: Michael L. Tracht, Ingolstadt (DE); Sebastian Uschold, Munich (DE)

(73) Assignee: Lear Corporation, Southfield, MI (US)

( * ) Notice: Subject to any disclaimer, the term of this patent is extended or adjusted under 35 U.S.C. 154(b) by 288 days.

(21) Appl. No.: 11/673,024

(22) Filed: Feb. 9, 2007

(65) Prior Publication Data

US 2007/0187933 A1 Aug. 16, 2007

(30) Foreign Application Priority Data

Feb. 16, 2006 (DE) .................. 10 2006 007 301

(51) Int. Cl.
*B60R 21/207* (2006.01)
*B60R 21/215* (2006.01)
*B60R 21/217* (2006.01)

(52) U.S. Cl. ............... 280/728.2; 280/730.2; 280/728.3

(58) Field of Classification Search ............. 280/728.2, 280/728.3, 730.2; 297/216.1
See application file for complete search history.

(56) References Cited

U.S. PATENT DOCUMENTS

| | | | | |
|---|---|---|---|---|
| 4,479,287 A | * | 10/1984 | Asaka ................... | 29/512 |
| 5,398,958 A | * | 3/1995 | Taggart ................. | 280/728.2 |
| 5,498,030 A | * | 3/1996 | Hill et al. .............. | 280/743.1 |
| 5,749,597 A | * | 5/1998 | Saderholm ............. | 280/728.2 |
| 5,762,363 A | * | 6/1998 | Brown et al. ........... | 280/730.2 |
| 5,816,610 A | | 10/1998 | Higashiura et al. | |
| 5,860,673 A | | 1/1999 | Hasegawa et al. | |
| 5,890,734 A | * | 4/1999 | Saderholm ............. | 280/730.2 |
| 5,906,390 A | | 5/1999 | Phillion et al. | |
| 5,927,749 A | * | 7/1999 | Homier et al. .......... | 280/730.2 |
| 5,938,232 A | | 8/1999 | Kalandek et al. | |
| 5,967,546 A | * | 10/1999 | Homier et al. .......... | 280/730.2 |
| 6,045,151 A | * | 4/2000 | Wu ....................... | 280/728.3 |
| 6,109,645 A | | 8/2000 | Totani et al. | |
| 6,206,410 B1 | * | 3/2001 | Brown ................... | 280/728.3 |
| 6,213,498 B1 | | 4/2001 | Ghalambor et al. | |

(Continued)

FOREIGN PATENT DOCUMENTS

DE 697 22 698 T2 4/2004

(Continued)

*Primary Examiner*—Paul N Dickson
*Assistant Examiner*—Drew Brown
(74) *Attorney, Agent, or Firm*—Brooks Kushman P.C.

(57) ABSTRACT

A vehicle seat component (18) includes a side air bag module (18) mounted on a frame (24) within a trim cover (30) that also covers a seat pad (26). An air bag guide (44) includes flexible inner and outer panels (46,48) that extend between a release seam (32) of the trim cover (30) and the air bag module (18) to provide a guiding function to an air bag (36) upon inflation so as to project outwardly through the release seam (32) for use. An inner extremity (52) of the flexible inner panel (46) of the air bag guide (44) has a grommet (58) that is secured to a frame (24) by a threaded stud (38) and a nut (40) that also mount the air bag module on the frame, and the inner extremity (56) of the flexible outer panel (48) is secured in any suitable manner to the seat component.

19 Claims, 4 Drawing Sheets

U.S. PATENT DOCUMENTS

| | | |
|---|---|---|
| 6,237,934 B1 * | 5/2001 | Harrell et al. ............ 280/728.3 |
| 6,352,304 B1 * | 3/2002 | Sorgenfrei ............. 297/216.13 |
| 6,450,528 B1 | 9/2002 | Suezawa et al. |
| 6,588,838 B1 * | 7/2003 | Dick, Jr. et al. ........ 297/216.13 |
| 6,612,609 B1 | 9/2003 | Rodriguez et al. |
| 2005/0067819 A1 | 3/2005 | Segura |
| 2005/0156412 A1 | 7/2005 | Panagos et al. |

FOREIGN PATENT DOCUMENTS

| | | |
|---|---|---|
| WO | 2005/102789 A1 | 11/2005 |

* cited by examiner

VEHICLE SEAT AIR BAG GUIDE HAVING FLEXIBLE PANEL WITH INNER EXTREMITY GROMMET SECUREMENT

CROSS-REFERENCE TO RELATED APPLICATIONS

This application claims foreign priority benefits under 35 U.S.C. § 119(a)-(d) to DE 10 2006 007 301.0, filed Feb. 16, 2006, which is hereby incorporated by reference in its entirety.

BACKGROUND OF THE INVENTION

1. Field of the Invention

This invention relates to a vehicle seat component side air bag module having an air bag guide with a flexible panel having inner extremity grommet securement.

2. Background Art

Vehicle seat components have previously included side air bag modules and conventionally include trim covers that have an air bag release seam through which an air bag upon deployment is projected outwardly from within the seat to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflator for movement from within the seat component outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment.

Other prior art noted by an investigation conducted in connection with the present application include: U.S. Pat. No. 5,906,390 Phillion et al.; U.S. Pat. No. 6,109,645 Totaui et al.; U.S. Pat. No. 6,213,498 Ghalambor et al.; U.S. Pat. No. 6,450,528 Suezawa et al.; and U.S. Pat. No. 6,612,609 Rodriguez et al.; and United States Patent Application Publication US 2005/0067819 Segura.

SUMMARY OF THE INVENTION

An object of the present invention is to provide an improved vehicle seat side air bag module for providing seat occupant protection.

A vehicle seat component constructed in accordance with the invention includes a frame for mounting on an associated vehicle on which the vehicle seat component is to be used. A seat pad is mounted by the frame and has a side extremity, and a trim cover extends over the seat pad and has an air bag release seam adjacent the side extremity of the seat pad. An air bag module is mounted on the frame within the trim cover in a spaced relationship from its air bag release seam. The air bag module includes an inflator and an air bag that is inflated by the inflator and projected outwardly from the seat component through the air bag release seam of the trim cover. The air bag module includes at least one threaded mounting stud that extends through the frame, and the air bag module also includes a mounting nut threaded onto the mounting stud to secure the air bag module to the frame. An air bag guide of the seat component includes a panel made of flexible material and having outer and inner extremities with its outer extremity located adjacent the air bag release seam of the cover. The flexible panel extends from its outer extremity to the air bag module and thence respectively inwardly of the air bag module. A grommet is secured to the inner extremity of the flexible inner panel and made of a noncreep material. The grommet has a hole through which the air bag module mounting stud extends to be secured by the mounting nut.

The grommet is secured either between the mounting nut and the frame or between the air bag module and the frame.

The air bag guide as disclosed also includes a second flexible panel that has inner and outer extremities with its outer extremity located adjacent the air bag release seam. The second flexible panel extends alongside the first flexible panel from its outer extremity to the air bag module and thence outwardly thereof such that the first and second flexible panels embody inner and outer flexible panels between which the air bag module is guided to the release seam upon inflation. The inner extremity of the flexible outer panel is secured to the seat component.

The air bag module includes a second threaded mounting stud and a second mounting nut threaded onto the second mounting nut to cooperate with the other threaded mounting stud and mounting nut in securing the air bag module on the frame. The inner extremity of the flexible inner panel includes a second grommet made of a noncreep material, and the second grommet has a hole through which the second mounting stud extends to be secured by the second mounting nut. The second grommet like the first grommet is located between either the second mounting nut and the frame or between the air bag module and the frame to cooperate with the first mounting stud and first mounting nut in securing the inner extremity of the flexible inner panel.

As disclosed, the release seam may include stitching, the outer extremities of the inner and outer flexible panels may have securements to the trim cover, and the securements of the outer extremities of the inner and outer flexible panels to the trim cover may be provided by stitching.

The vehicle seat component has particular utility as a seat back, especially with outboard locations and with the air bag module, the air bag guide, and the release seam at the outboard locations to provide protection from adjacent vehicle structure.

The grommet construction disclosed has an annular shape including opposite sides that respectively contact either the frame and the mounting nut or the frame and the air bag module. The grommet also has a connecting portion extending between its opposite sides, and the inner extremity of the flexible inner panel is clamped between the opposite sides between which the connection portion extends.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
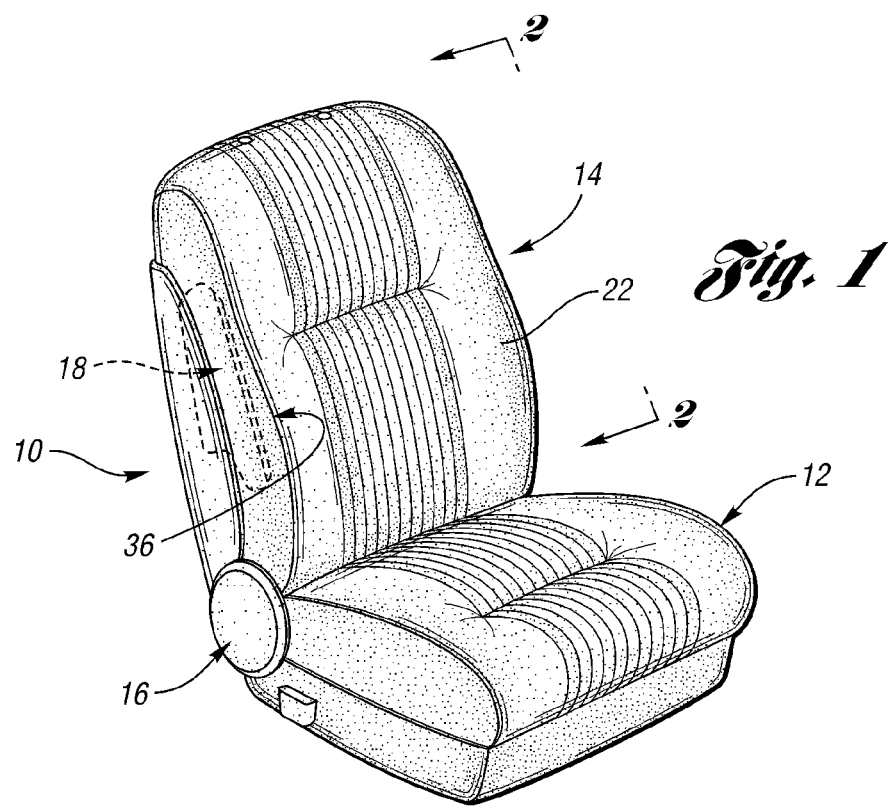
FIG. 1 is a perspective view of a vehicle seat including a seat back component constructed in accordance with the invention to include a side air bag module that is shown by hidden line illustration.
Figure 2:
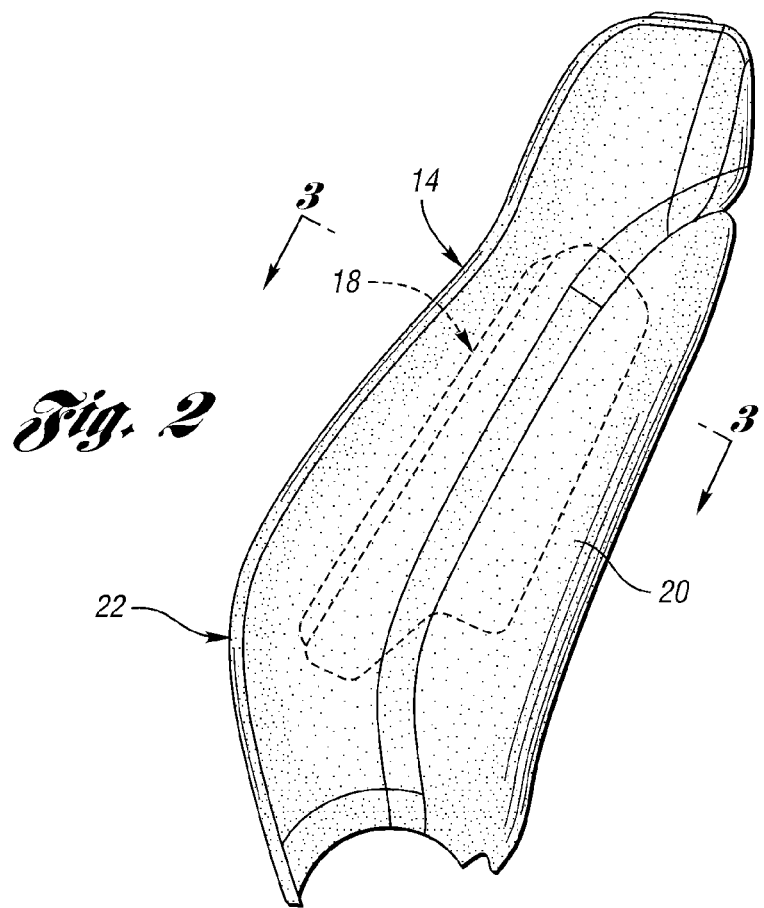
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag module 18 that is operable to provide seat occupant protection. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that is conventionally molded from plastic and also includes a front cushion 22 against which the seat occupant leans to provide back support and in which the side air bag module 18 is located.

Figure 3:
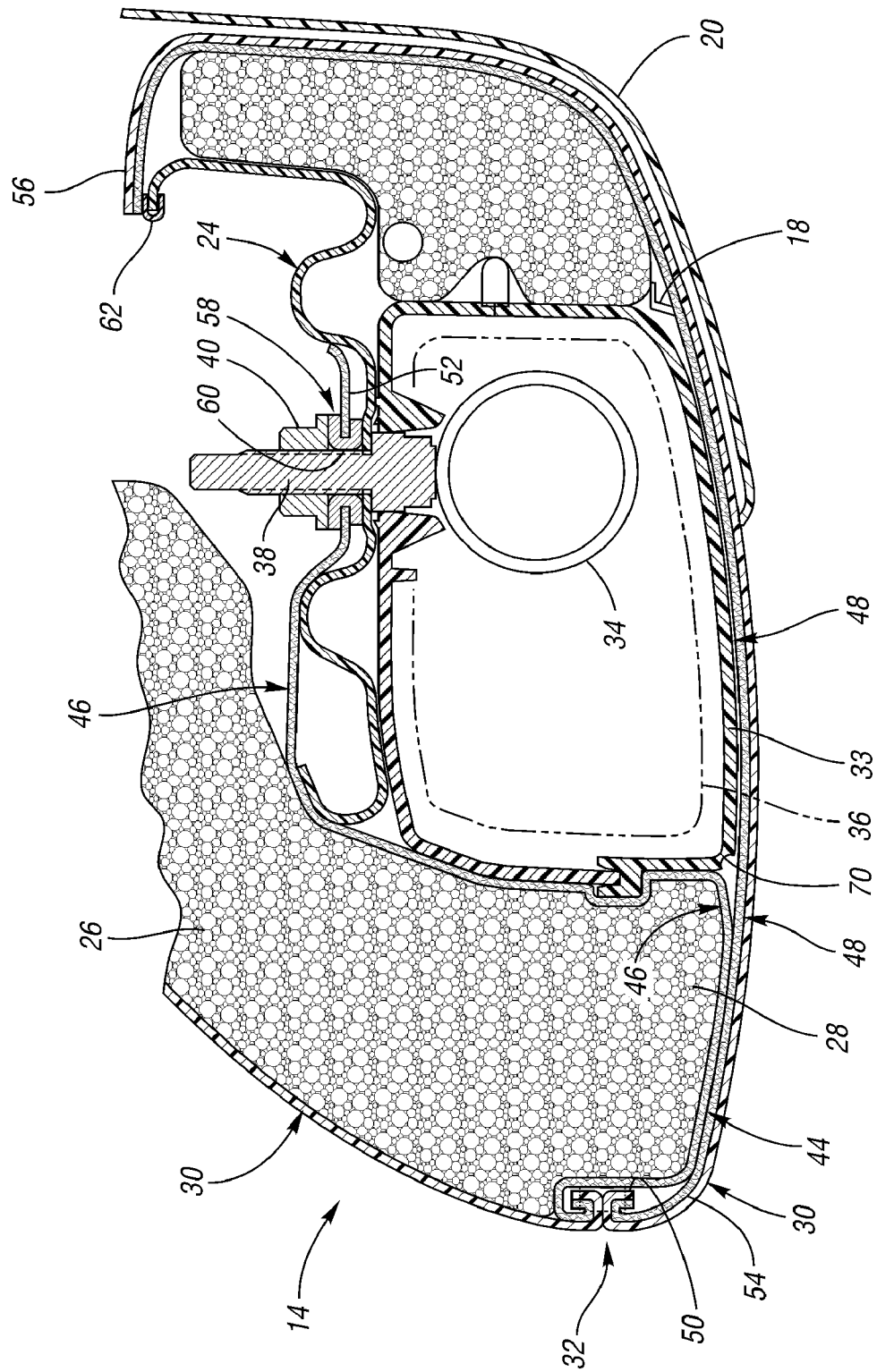
FIG. 3 is a sectional view taken through the seat back component along the direction of line 3-3 in FIG. 2 to further illustrate the construction of the side air bag module and an air bag guide within the seat back component.

As shown in FIG. 3, the seat back component 14 includes a frame collectively identified by 24. A foam seat pad 26 is mounted on the frame 24 in any conventional manner and has opposite side extremities 28 (only one shown) spaced laterally from each other at the opposite lateral sides of the seat. A trim cover generally indicated by 30 extends over the seat pad 26 and includes an air bag release seam 32 adjacent the one shown seat pad side extremity 28 which corresponds to an outboard location. The side air bag module 18 is located within the trim cover 30 mounted on the frame 24, as described below, adjacent but in a spaced relationship from the trim cover release seam 32. The air bag module 18 includes a housing 33 and an inflator 34 and a schematically illustrated folded or rolled stored air bag 36 which, upon deployment, is inflated by the inflator to project outwardly from the seat component through the air bag release seam 32 of the trim cover 30. The air bag module 18 also includes at least one threaded mounting stud 38 that extends through a hole in the frame 24, and the air bag module also includes a mounting nut 40 threaded onto the stud to secure the air bag module to the frame.

With continuing reference to FIG. 3, an air bag guide of the seat back component is generally indicated by 44 and as disclosed includes an inner panel 46 and an outer panel 48 that are each made of a flexible material such as a suitable cloth. The flexible inner panel 46 has an outer extremity 50 adjacent the air bag release seam 32 and also has an inner extremity 52 as is hereinafter more fully described. The flexible outer panel 48 has an outer extremity 54 adjacent the air bag release seam 32 and has an inner extremity 56 which is hereinafter more fully described.

As shown in FIG. 3, a grommet 58 is secured to the inner extremity 52 of the flexible inner panel and is made of a noncreep material which may be a nonductile metal, a rigid synthetic resin or other resin reinforced with glass or another material so as not to creep. The grommet has a hole 60 through which the air bag module stud 38 extends and is located between the mounting nut 40 and the frame 24 in contact with each to provide securement of the inner panel. In another embodiment shown in FIG. 7, the grommet 58 is located between the air bag module at its housing 33 and the frame 24 in contact with each to provide securement of the inner panel.

As also shown in FIG. 3, a connector 62 of any suitable type secures the inner extremity 56 of the flexible outer panel 48 in any suitable manner such as to the frame 24 by a hook type construction. It is also possible to otherwise secure the inner extremity 56 of the flexible outer panel 48 to the seat in any other suitable manner at other locations than the one shown.

Figure 4:
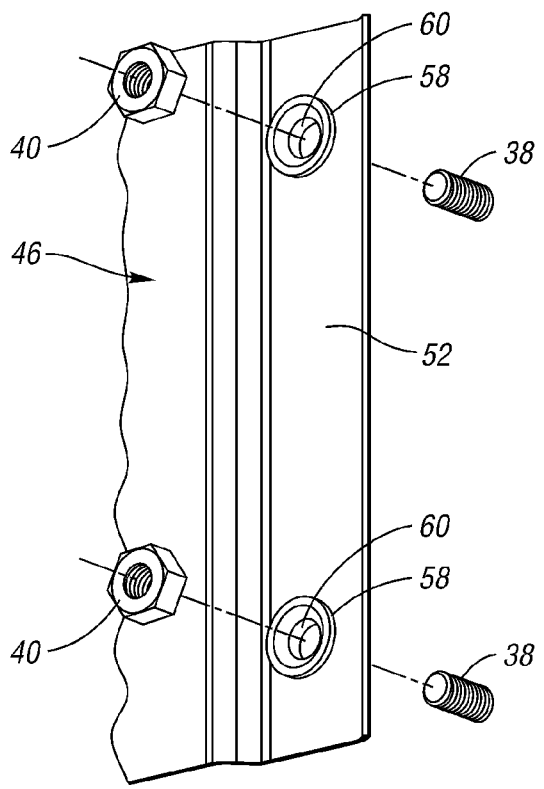
FIG. 4 is a partial exploded perspective view illustrating the manner in which an inner extremity of a flexible panel of the air bag guide is secured by a threaded stud, a nut and a grommet.

As illustrated in FIG. 4, there are actually a pair of the threaded studs 38, a pair of the threaded nuts 40 and a pair of the grommets 58 that cooperate to secure the air bag module and the inner extremity 52 of the flexible inner panel 46 in the same manner illustrated in FIG. 3. Both grommets 58 are located as described above either between the associated mounting nut 40 and the frame 24 or between the air bag module at its housing 33 and the frame 24. Also, while three or more of the studs, nuts and grommets could also be utilized, testing to date has indicated that two are sufficient.

Figure 5:
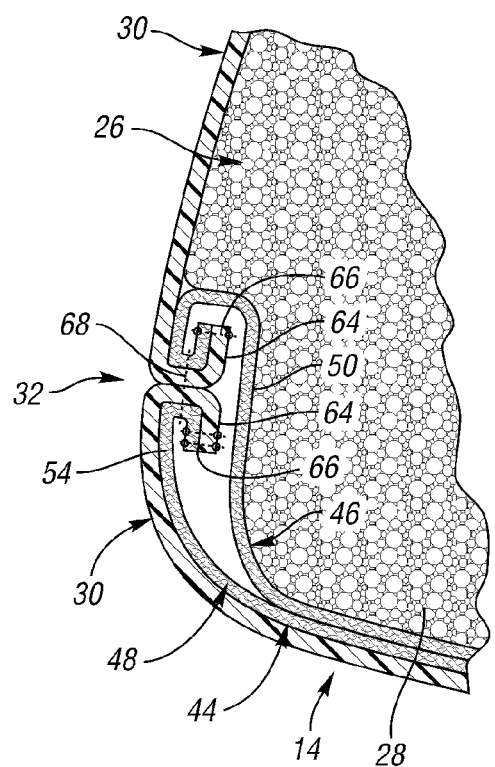
FIG. 5 is an enlarged view of a portion of FIG. 3 illustrating an air bag release seam of a trim cover of the seat back component.

As shown in FIG. 5, the air bag release seam 32 includes bent seam ends 64 of the trim cover 30 and the outer extremities 50 and 54 of the flexible inner and outer panels 46 and 48. Stitching 66 may provide securement of the flexible panel outer extremities 50 and 54 to the trim cover 30 and stitching 66 may provide securement of the bent ends 64 to each other.

From the air bag release seam 32 illustrated in FIG. 3, the flexible inner and outer panels 46 and 48 extend alongside each other from their outer extremities 50 and 54 to the side air bag module 18 and thence inwardly and outwardly thereof for connection within the seat back component as previously described. Upon deployment of the side air bag module 18, the air bag 36 fractures a housing seam 70 and moves out of the housing 33 and between the flexible inner and outer panels 46 and 48 which then provide a guiding function of the air bag 36. The air bag 36 thus moves between the flexible inner and outer panels 46 and 48 toward the air bag release seam 32 and eventually tears open the release seam for outward projection of the air bag to provide the occupant protection.

The inner and outer flexible panels 46 and 48 may be made of any suitable flexible material effective to guide the air bag 36 from the module to the release seam. For example, a woven or non-woven cloth material, which may include natural materials or a synthetic material such as nylon. One material that is found to be effective is a polyester material of the type from which the air bag 36 may be manufactured. Regardless of the type of material used to make the air bag guide 44, the use of the air bag guide can be helpful in reducing friction on the air bag 36 as it is deployed. Although a polymer such as nylon may be particularly beneficial, even a fleece material will help reduce the friction on the air bag 36 because the air bag guide 44 prevents contact between the deploying air bag 36 and the seat pad 26.

In some applications depending upon whether the stored air bag is folded or rolled and the direction of the folding or rolling, the grommet secured flexible inner panel 46 may function without the flexible outer panel 48.

Figure 6:
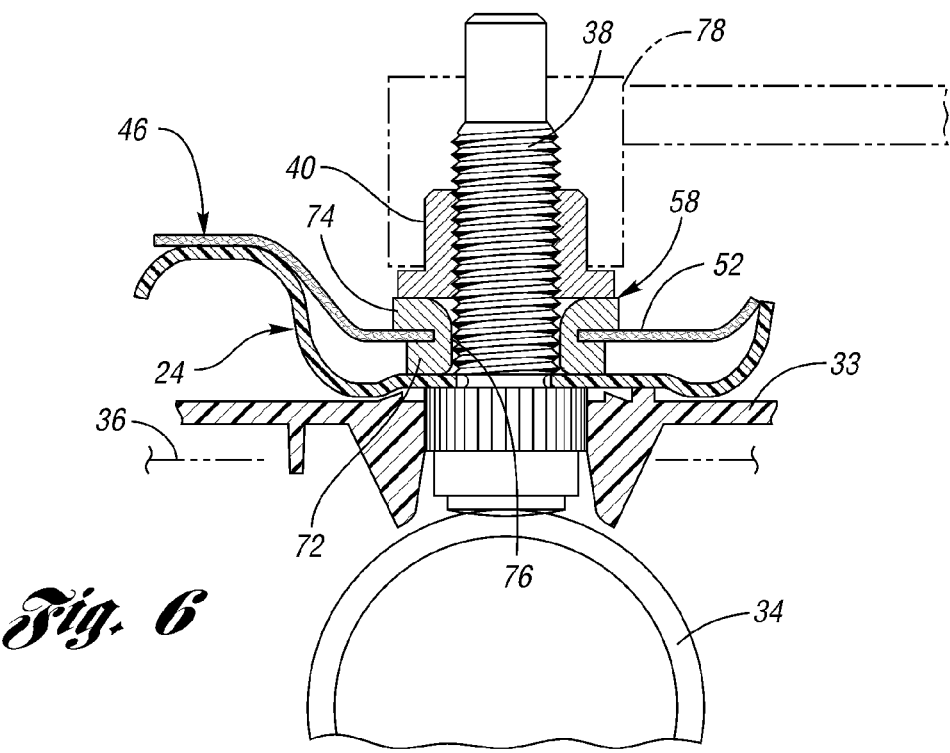
FIG. 6 is an enlarged view of a portion of FIG. 5 illustrating the threaded stud, nut and grommet securement of the inner extremity of the flexible panel of the air bag guide and the manner in which the nut is threaded to its final position by a torque wrench.
Figure 7:
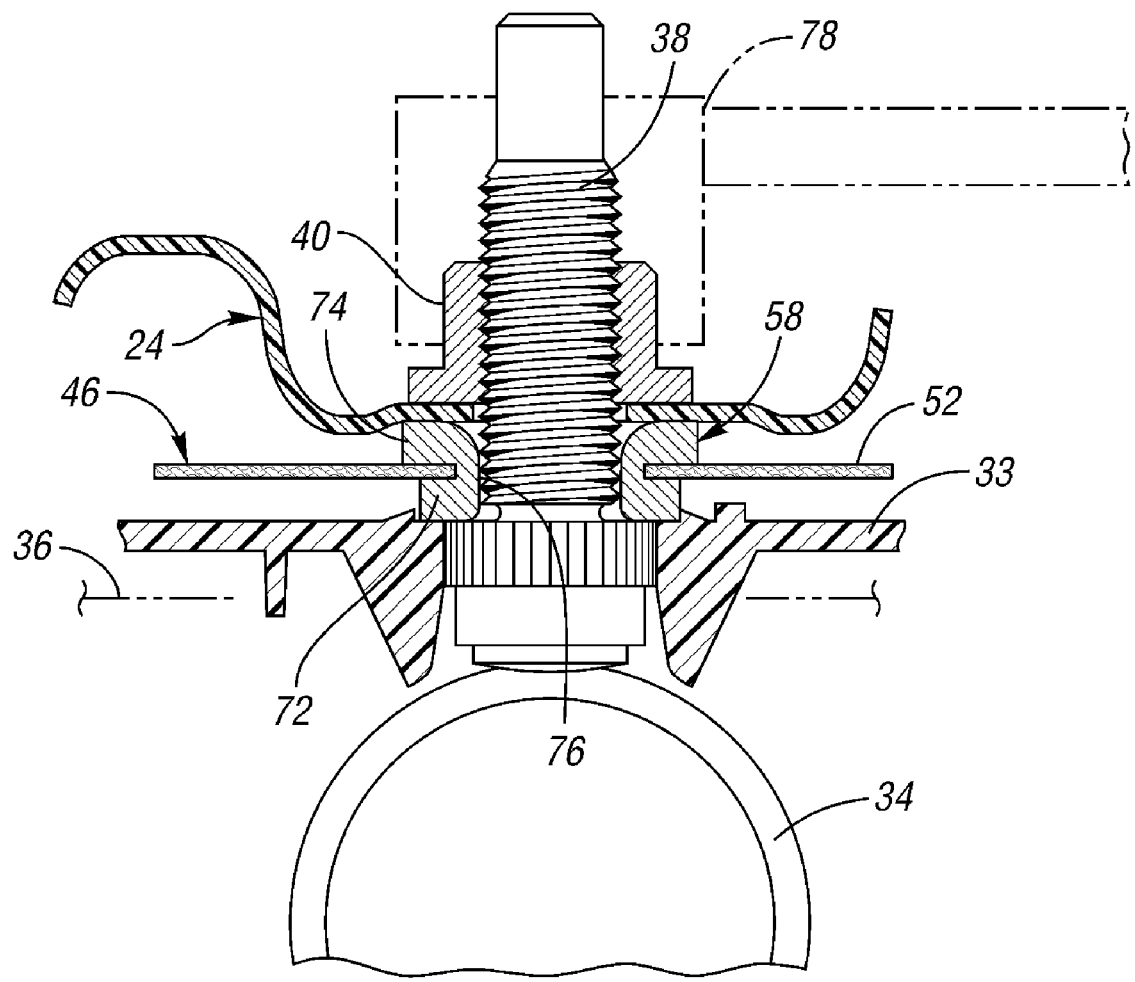
FIG. 7 is a view similar to FIG. 6 wherein the grommet is clamped between the frame and the air bag module instead of between the frame and the nut.

As shown in FIG. 4, each grommet 58 has an annular construction defining its associated stud hole 60. Furthermore, as shown in FIGS. 6 and 7, each grommet has opposite sides 72 and 74 that respectively contact either the frame 24 and the mounting nut 40 (FIG. 6) or the frame 24 and the air bag module at its housing 33 (FIG. 7) in the assembled condition. The grommet 58 also has a connecting portion 76 extending between its sides 72 and 74. The inner extremity 52 of the flexible inner panel 46 has a hole in which the grommet 58 is located and is clamped between the opposite sides 72 and 74 of the grommet.

As also shown in FIGS. 6 and 7, a torque wrench 78 is used to torque the nut 40 onto the threaded stud 38 and may be of the type that reads angular rotation as well as the applied torque to insure that everything is assembled within the required tolerances.

Also, while the side air bag module 18 described above has particular utility for use with a vehicle seat back, especially at its outboard location, it is also possible for the side air bag to be utilized with other vehicle seat components such as with a seat bottom.

While preferred embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention.

What is claimed is:

1. A vehicle seat component comprising:
   a frame for mounting on an associated vehicle on which the vehicle seat component is to be used;
   a seat pad mounted by the frame and having a side extremity;
   a trim cover extending over the seat pad and having an air bag release seam adjacent the side extremity of the seat pad;
   an air bag module within the trim cover in a spaced relationship from its air bag release seam, the air bag module including an inflator and a air bag that is inflated by the inflator to project outwardly from the seat component through the air bag release seam of the trim cover, and the air bag module including at least one threaded mounting stud that extends through the frame and the air bag module also including a mounting nut threaded onto the mounting stud to secure the air bag module to the frame;
   an air bag guide including a panel made of flexible material and having outer and inner extremities with its outer extremity located adjacent the air bag release seam of the cover, the flexible panel extending from its outer extremity to the air bag module and thence respectively inwardly thereof; and
   a grommet secured to the inner extremity of the flexible panel and made of a noncreep material, and the grommet having a hole through which the air bag module mounting stud extends to be secured by the mounting nut.

2. A vehicle seat component as in claim 1 wherein the grommet is secured between the mounting nut and the frame.

3. A vehicle seat component as in claim 1 wherein the grommet is secured between the air bag module and the frame.

4. A vehicle seat component as in claim 1 further including a second flexible panel having outer and inner extremities with its outer extremity located adjacent the air bag release seam, the second flexible panel extending alongside the first mentioned flexible panel from its outer extremity to the air bag module and thence outwardly thereof such that the first mentioned and second flexible panels respectively embody flexible inner and outer panels between which the air bag is guided to the release seam of the trim cover upon inflation, and the inner extremity of the flexible outer panel being secured to the seat component.

5. A vehicle seat component as in claim 4 wherein the air bag module includes a second threaded mounting stud and a second mounting nut threaded onto the second mounting nut to cooperate with the first mentioned threaded mounting stud and mounting nut in securing the air bag module on the frame, the inner extremity of the flexible inner panel including a second grommet made of a noncreep material, and the second grommet having a hole through which the second mounting stud extends to be secured by the second mounting nut.

6. A vehicle seat component as in claim 5 wherein the second grommet is located between the second mounting nut and the frame to cooperate with the first mentioned mounting stud and mounting nut in securing the inner extremity of the flexible inner panel.

7. A vehicle seat component as in claim 5 wherein the second grommet is secured between the air bag module and the frame to cooperate with the first mentioned mounting stud and mounting nut in securing the inner extremity of the flexible inner panel.

8. A vehicle seat component as in claim 4 wherein the release seam includes stitching.

9. A vehicle seat component as in claim 4 wherein the outer extremities of the inner and outer flexible panels have securements to the trim cover.

10. A vehicle seat component as in claim 9 wherein the securements of the outer extremities of the inner and outer flexible panels to the trim cover comprise stitching.

11. A vehicle seat component as in claim 4 wherein the release seam includes stitching and wherein the outer extremities of the inner and outer flexible panels have stitching securements to the trim cover.

12. A vehicle seat component as in claim 4 which comprises a seat back.

13. A vehicle seat component as in claim 4 which has an outboard side at which the air bag module, the air bag guide, and the release seam are located.

14. A vehicle seat component as in claim 4 which comprises a seat back having outboard side at which the air bag module, the air bag guide, and the release seam are located.

15. A vehicle seat component as in claim 1 wherein the grommet has an annular shape including opposite sides that respectively contact the frame and the mounting nut, the grommet having a connecting portion extending between its opposite sides, and the inner extremity of the flexible inner panel being clamped between the opposite sides between which the connecting portion extends.

16. A vehicle seat component as in claim 1 wherein the grommet has an annular shape including opposite sides that respectively contact the frame and the air bag module, the grommet having a connecting portion extending between its opposite sides, and the inner extremity of the flexible inner panel being clamped between the opposite sides between which the connecting portion extends.

17. A vehicle seat component comprising:

a frame for mounting on an associated vehicle on which the vehicle seat component is to be used;

a seat pad mounted by the frame and having a side extremity;

a trim cover extending over the seat pad and having an air bag release seam adjacent the side extremity of the seat pad;

an air bag module within the trim cover in a spaced relationship from its air bag release seam, the air bag module including an inflator and a air bag that is inflated by the inflator to outwardly from the seat component through the air bag release seam of the trim cover, the air bag module including a plurality of threaded mounting studs that extend through the frame, and the air bag module also including a plurality of mounting nuts respectively threaded onto the mounting studs to secure the air bag module to the frame;

an air bag guide including an inner panel and an outer panel that are each made of flexible material and have outer and inner extremities with their outer extremities located adjacent the air bag release seam of the cover, the flexible inner and outer panels extending alongside each other from their outer extremities to the air bag module and thence respectively inwardly and outwardly thereof;

a plurality of grommets secured to the inner extremity of the flexible inner panel at spaced locations from each other, the grommets being made of a noncreep material, each grommet having an annular shape including a hole through which an associated air bag module mounting stud extends, each grommet having opposite sides and a connecting portion extending between its opposite sides and defining the hole through which the associated mounting stud extends, and the inner extremity of the flexible inner panel being clamped between the opposite sides of each grommet; and the inner extremity of the flexible outer panel being secured within the seat.

18. A vehicle seat back comprising:

a frame for mounting on an associated vehicle on which the vehicle seat back is to be used;

a seat pad mounted by the frame and having an outboard side extremity;

a trim cover extending over the seat pad and having an air bag release seam adjacent the side extremity of the seat pad;

an air bag module at an outboard side location within the trim cover in a spaced relationship from its air bag release seam, the air bag module including an inflator and a air bag that is inflated by the inflator to project outwardly from the seat back through the air bag release seam of the trim cover, the air bag module including a plurality of threaded mounting studs that extend through the frame, and the air bag module also including a plurality of mounting nuts respectively threaded onto the mounting studs to secure the air bag module to the frame at an outboard location;

an air bag guide including an inner panel and an outer panel that are each made of flexible material and have outer and inner extremities with their outer extremities located adjacent the air bag release seam of the trim cover, the flexible inner and outer panels extending alongside each other from their outer extremities to the air bag module and thence respectively inwardly and outwardly thereof;

a plurality of grommets secured to the inner extremity of the flexible inner panel at spaced locations from each other, the grommets being made of a noncreep material, each grommet having an annular shape including a hole through which an associated air bag module mounting stud extends, each grommet having opposite sides and a connecting portion extending between its opposite sides and defining the hole through which the associated mounting stud extends, and the inner extremity of the flexible inner panel being clamped between the opposite sides of each grommet; and the inner extremity of the flexible outer panel being secured within the seat.

19. A vehicle seat component comprising:

a frame for mounting on an associated vehicle on which the vehicle seat component is to be used;

a seat pad mounted by the frame and having a side extremity;

a trim cover extending over the seat pad and having an air bag release seam adjacent the side extremity of the seat pad;

an air bag module within the trim cover in a spaced relationship from its air bag release seam, the air bag module including an inflator and a air bag that is inflated by the inflator to project outwardly from the seat component through the air bag release seam of the trim cover, and the air bag module including at least one threaded mounting stud that extends through the frame and the air bag module also including a mounting nut threaded onto the mounting stud to secure the air bag module to the frame;

an air bag guide including a panel made of flexible material and having outer and inner extremities with its outer extremity located adjacent the air bag release seam of the cover, the flexible panel extending from its outer extremity to the air bag module; and a grommet secured to the inner extremity of the flexible panel and made of a noncreep material, and the grommet having a hole through which the air bag module mounting stud extends to be secured by the mounting nut.

* * * * *

UNITED STATES PATENT AND TRADEMARK OFFICE
CERTIFICATE OF CORRECTION

PATENT NO. : 7,621,557 B2  Page 1 of 1
APPLICATION NO. : 11/673024
DATED : November 24, 2009
INVENTOR(S) : Michael L. Tract et al.

It is certified that error appears in the above-identified patent and that said Letters Patent is hereby corrected as shown below:

Column 5, Line 52, Claim 1:
Delete "a airbag" and insert -- an airbag --.

Column 7, Line 15, Claim 17:
Delete "a airbag" and insert -- an airbag --.

Column 7, Line 16, Claim 17:
After "to" and before "outwardly" insert -- project --.

Column 7, Line 54, Claim 18:
Delete "a airbag" and insert -- an airbag --.

Column 8, Line 37, Claim 19:
Delete "a airbag" and insert -- an airbag --.

Signed and Sealed this

Sixteenth Day of February, 2010

David J. Kappos
*Director of the United States Patent and Trademark Office*